US012664272B2

(12) United States Patent
    Pedersen

(10) Patent No.: US 12,664,272 B2
(45) Date of Patent: Jun. 23, 2026

(54) SECURITY IN INTEGRATED CIRCUITS

(71) Applicant: Nordic Semiconductor ASA, Trondheim (NO)

(72) Inventor: Frode Pedersen, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 120 days.

(21) Appl. No.: 18/562,491

(22) PCT Filed: May 24, 2022

(86) PCT No.: PCT/EP2022/064096
    § 371 (c)(1),
    (2) Date: Nov. 20, 2023

(87) PCT Pub. No.: WO2022/248493
    PCT Pub. Date: Dec. 1, 2022

(65) Prior Publication Data
    US 2024/0265100 A1      Aug. 8, 2024

(30) Foreign Application Priority Data

May 24, 2021    (GB) ...................................... 2107381

(51) Int. Cl.
    *G06F 21/56*            (2013.01)
    *G06F 1/04*             (2006.01)
(52) U.S. Cl.
    CPC ............... *G06F 21/56* (2013.01); *G06F 1/04* (2013.01); *G06F 2221/034* (2013.01)
(58) Field of Classification Search
    CPC .......... G06F 21/755; G06F 1/08; G06F 7/582; H04L 9/002; H04L 9/003
    See application file for complete search history.

(56) References Cited

U.S. PATENT DOCUMENTS

| | | | |
|---|---|---|---|
| 8,115,532 B2* | 2/2012 | Zhang .................. | H03H 11/265 327/272 |
| 8,971,447 B1* | 3/2015 | Kao ..................... | H04L 25/0314 375/232 |
| 2008/0189555 A1* | 8/2008 | Sohn ..................... | G06F 21/755 713/192 |
| 2010/0007398 A1* | 1/2010 | Zhang .................. | H03H 11/265 327/261 |
| 2011/0285420 A1* | 11/2011 | Deas ....................... | H04L 9/003 326/8 |

(Continued)

FOREIGN PATENT DOCUMENTS

EP          3 420 667 A1      1/2019

OTHER PUBLICATIONS

International Search Report and Written Opinion for PCT/EP2022/064096, mailed Sep. 19, 2022, 12 pages.

(Continued)

*Primary Examiner* — Tae K Kim
(74) *Attorney, Agent, or Firm* — Klarquist Sparkman, LLP

(57) ABSTRACT

An integrated circuit has multiple clock domains. At least one of the clock domains is a secure domain including a protection clock portion. The protection clock portion is arranged to produce a clock signal having a clock period which varies randomly over at least some cycles of operation. The clock signal is arranged to clock one or more components in the secure domain.

10 Claims, 3 Drawing Sheets

(56) References Cited

U.S. PATENT DOCUMENTS

| | | | |
|---|---|---|---|
| 2013/0019324 A1* | 1/2013 | Tehranipoor | H03K 3/0315 |
| | | | 726/34 |
| 2014/0043176 A1* | 2/2014 | Tomasovics | H03M 3/00 |
| | | | 341/200 |
| 2017/0244546 A1* | 8/2017 | Stark | G06F 7/582 |
| 2017/0262630 A1* | 9/2017 | Teper | H04L 9/003 |
| 2017/0365355 A1* | 12/2017 | Wang | G11C 29/023 |
| 2019/0332135 A1* | 10/2019 | Tamura | G06F 1/06 |
| 2020/0402929 A1 | 12/2020 | Lentz et al. | |
| 2024/0160793 A1* | 5/2024 | Pedersen | G06F 21/72 |

OTHER PUBLICATIONS

ISO Combined Search and Examination Report under Sections 17 and 18(3) for Great Britain Application No. 2107381.2, dated Feb. 16, 2022, 8 pages.

\* cited by examiner

| 26 | 0 | 0 | 1 | 0 | 0 | 1 | 1 |
| 28 | 6 | 5 | 4 | 5 | 4 | 3 | 4 |

30

SECURITY IN INTEGRATED CIRCUITS

CROSS REFERENCE TO RELATED APPLICATIONS

This is the U.S. National Stage of International Application No. PCT/EP2022/064096, filed May 24, 2022, which was published in English under PCT Article 21(2), which in turn claims the benefit of Great Britain Application No. 2107381.2, filed May 24, 2021.

This invention relates to integrated circuits (ICs) and more particularly to the provision of measures which may help protect against unauthorised access to the device.

As ICs have become more complex and powerful, an increasing amount of attention has been paid to the risks posed by unauthorised access to certain parts—e.g. those which contain sensitive data or software or which can be used to exercise unauthorised control of a device incorporating the IC. Manufacturers therefore now routinely employ measures to discourage or prevent such access by hackers.

In recent years, hackers have begun to tamper with actively running digital circuits by performing side channel attacks. Integrated circuits in operation emit side channel information such as power noise, electromagnetic emissions, or timing information. All of these can reveal information about secret keys in a circuit or device. For example, the power consumption of a circuit at a certain time may provide information about the operation the circuit is performing at that moment in time.

Side channel attacks exploit statistical analysis of such side channels. Such statistical analysis typically involves aligning a number of traces, for example power traces, typically in the thousands, to understand how they correlate with possible key values to gain access to the secret keys and therefore gain access to the protected information in the circuit. Side channel attacks are therefore based on information gained from the implementation of a computer system, rather than weaknesses in the implemented algorithm itself. Timing information, power consumption, electromagnetic leaks or even sound can provide an extra source of information, which can be exploited.

The Applicant has recognised that such side channel attacks pose a security threat to integrated circuits and thus that mitigation measures are desirable. Typically, mitigation against side channel attacks include: inserting dummy cycles into critical logic (e.g. crypto accelerator), ensuring the execution time is not data dependent (a form of protection against timing attacks), or a switched capacitance supply that reduces the power signature.

The present invention aims at least partly to address the issues set out above and when viewed from a first aspect provides an integrated circuit comprising a plurality of clock domains, wherein at least one of the clock domains is a secure domain comprising a protection clock portion arranged to produce a clock signal having a clock period which varies randomly over at least some cycles of operation, said clock signal being arranged to clock one or more components in said secure domain.

When viewed from a second aspect the invention provides a method of preventing side-channel attacks on a secure domain of an integrated circuit comprising a plurality of clock domains, comprising producing a clock signal having a clock period which varies randomly over at least some cycles of operation, and using said clock signal to clock one or more components in said secure domain.

Thus it will be appreciated by those skilled in the art that the present invention provides an integrated circuit which may help to protect against side channel attacks by randomly shifting the clock period of the protection clock associated with the secure domain such that it 'jitters', thus making statistical analysis of the side channel traces very difficult. Side channel attacks using statistical trace analysis become much more difficult if the traces are not aligned in time, such that traces from different runs do not overlap. In other words, as the above described integrated circuit may de-correlate the side-channel traces, it may protect against side channel attacks as the side-channel traces will be de-correlated.

Prior art methods such as executing dummy cycles in critical hardware such as crypto accelerators result in a randomly varying execution time, however this will only protect the circuit which contains that countermeasure. In addition, dummy cycles cause the circuit to consume extra energy. The side channel attack mitigation measure in accordance with the present invention may be used with existing circuitry designs which are not designed with side-channel countermeasures, and does not increase the circuit power consumption.

The solution described above may be used in isolation or in combination with previously described countermeasures to mitigate against side channel attacks. The solution outlined above can also be implemented fully digitally and as such, introduces no need for additional analogue components into the circuit. There is no need for additional power consumption by the random clock variation of the protection clock portion, and as such embodiments of the invention can be used for mitigation of side-channel attacks using statistical analysis of both power consumption and timing.

The Applicant has recognised that as the random variation of the clock period of the protection clock portion slightly extends the average clock period, there is a very minor associated performance loss. However, the skilled person will recognise that the benefit of being able to provide such protection with no net effect on the energy consumption of the circuit outweighs the minor performance loss.

The arrangements set out above may be implemented on any protected clock domains where it is desirable to prevent side-channel attacks.

The clock signal could be varied only some of the time—e.g. for a certain number of cycles or during certain modes of operation. Preferably however, the clock signal is varied randomly over every cycle of operation. If the clock period is varied every cycle of operation, statistical analysis of the clock signal of the circuit, or analysis of the power traces may be difficult as there may be little or no correlation between the clock period and the current operation of the circuit.

It will be well understood by the skilled person that references herein to varying the clock signal randomly are intended to include any suitable practical technique for generating random or pseudorandom signals. It is not essential that the variation gives a truly mathematically random clock period—i.e. not fully random.

In a set of embodiments, the protection clock portion comprises a delay-line based oscillator, the delay-line based oscillator comprising a plurality of delay elements which may be selectively incorporated to form a delay chain. The output of the delay chain may then be used as the output clock signal from the oscillator. The period of the clock may therefore be varied depending on how many of the delay elements are added and how much delay each introduces to the clock period in order to extend it. The clock period is randomly varied in order to prevent side-channel attacks, and it is therefore desirable that the configuration of delay elements is varied randomly for different clock cycles.

The delay elements could comprise analogue unit delays, e.g. which create a time difference between their inputs and outputs, on an analogue signal whose amplitude varies continuously. In a set of embodiments however, the delay elements comprise standard cell-based unit delays. A standard cell based unit delay typically introduces a delay to the clock cycle based on a delay from the input to the output of a logic gate. A standard cell-based unit delay may be preferable as the digital form of delay eliminates some of the problems associated with analogue unit delays such as dissipation and noise. Standard cell-based delay units also respond immediately to a change in any delay setting, allowing the cycle period to change every cycle, thus allowing much more effective delay de-correlation.

In a set of embodiments, each delay element adds a delay which is twice the length of the delay added by the preceding element in the chain. In such embodiments, the delay introduced by each delay element may be written as $2^{n-1}\tau$, where n is the position of the delay element in the chain, and $\tau$ is the 'unit' delay added by the first delay element. It will therefore be appreciated that any multiple of the unit delay $\tau$ may be added to the clock period up to $2^N\tau-1$, where N is the total number of delay elements. For example, for a delay of $7\tau$, delays of $\tau$, $2\tau$, and $4\tau$ may be added to the clock period to produce an overall delay of $7\tau$.

In a set of embodiments, each delay element in the protection clock portion is connected to a respective independent multiplexer, wherein each multiplexer is selectively controlled by a respective bit of a value in a selector register. Each independent multiplexer could have two inputs, one of which is the corresponding delay element, and one of which provides no delay to the clock signal. Such an arrangement may ensure that each independent multiplexer selectively controls whether the delay element to which it is connected is added to the delay chain for that particular clock cycle, or if no delay is added from that delay element. The selector register controls the multiplexer outputs. Each delay element may therefore be bypassed independently by the selector register, which therefore controls the length of the delay chain, and thus the period of the clock cycle.

In a set of embodiments, the selector register is updated in successive cycles of operation with a new value, offset from a previous value by a fixed magnitude but with random sign (positive or negative). The selector register values may thus be randomly generated such by means of a random walk, increasing or decreasing by a fixed magnitude in every clock cycle. Therefore, every cycle of operation, the selector register will cause the output clock period to have a different delay period to the cycle preceding it, such that there is a different clock period every cycle of operation.

The protection clock portion could be arranged to add a random delay to a standard clock signal. In a set of embodiments however the protection clock portion is arranged to generate the clock signal itself. For example in a set of the embodiments outlined above, the protection clock portion further comprises a static register comprising a lowest permitted value of the delay chain and therefore sets the maximum frequency of the clock domain. The output value from the static register may then be added to a random variable and input to the selector register. As the static register output value represents the maximum frequency of the clock domain, adding a random variable to this will result in a random number being output by the selector register and therefore a random offset being applied by the delay-line based oscillator as described above. The maximum frequency of the domain may be determined by the critical path (i.e. the critical circuit portion) which the clock portion is arranged to protect from side channel attacks. The static value may be adjusted or tuned according to how much "jitter" is desired in the clock period versus the aforementioned small decrease in performance, which results from a longer average clock period.

In embodiments with an external input base clock signal, no static register may be necessary to produce an output value representing the maximum frequency of the domain, as the external clock itself will provide the input base clock signal.

In a set of embodiments, the protection clock portion comprises an offset value generator arranged to provide the random delay in accordance with the invention. The offset value generator may be used for example to generate the random variable which is added to the output value from the aforementioned register to produce the value which is output by the selector register. Preferably, the offset value is positive such that the selector register value is always at least slightly larger than that of the static register.

In a set of embodiments, the protection clock portion comprises a pseudorandom bit sequence (PRBS) generator, which outputs a random value of 0 or 1 every cycle. As will be appreciated, a PRBS generator typically outputs a periodic, deterministic signal with white-noise-like properties that shifts between two values (e.g. 0 and 1). The output value from the PRBS generator may be input to a multiplexer which generates a value of 1 if the PRBS output is 1 and -1 if the PRBS output is 0. The value may then be input to the offset value generator to increase or decrease the offset value. The offset value generator may comprise a feedback loop such that the multiplexer value is added to the previous offset value, such that the subsequent offset value for each clock cycle is only increased or decreased by 1. The pseudorandom bit sequence generator could be loaded with a true random value at the start of its operation or periodically.

As the PRBS generator will have a random output every clock cycle, the offset value output by the offset value generator will perform a non-predictable random walk, and wrap around at its extreme values.

For example, if a 4-bit offset value generator were used, an example offset value sequence is:
PRBS output: 1, 0, 0, 0, 0, 1, 0, 0, 0, . . . .
Multiplexer output: 1, -1, -1, -1, -1, 1, -1, -1, -1, . . .
.
OFFSET output: 3, 4, 3, 2, 1, 0, 1, 0, 15, 14, . . . .

It is clear that when the offset value is at 0 and is decremented by the output from the PRBS and multiplexer, that it wraps to its max value (15 in the case of a 4-bit offset). It will be appreciated that the range of offset values can be tuned according to how much jitter (random clock cycle variation) is desired versus trade-off in performance. In a set of embodiments the PRBS has at least 31 bits.

As explained above, the randomly controlled offset value may then combined with the static value, which is then input to the selector register to produce a selector value. The resultant selector value may then selectively control multiplexers in a delay-line based oscillator to add the delay for that clock cycle and the delay-line based oscillator will therefore output the clock signal.

Certain embodiments of the invention will now be described, by way of example only, with reference to the accompanying drawings in which.

Figure 1:
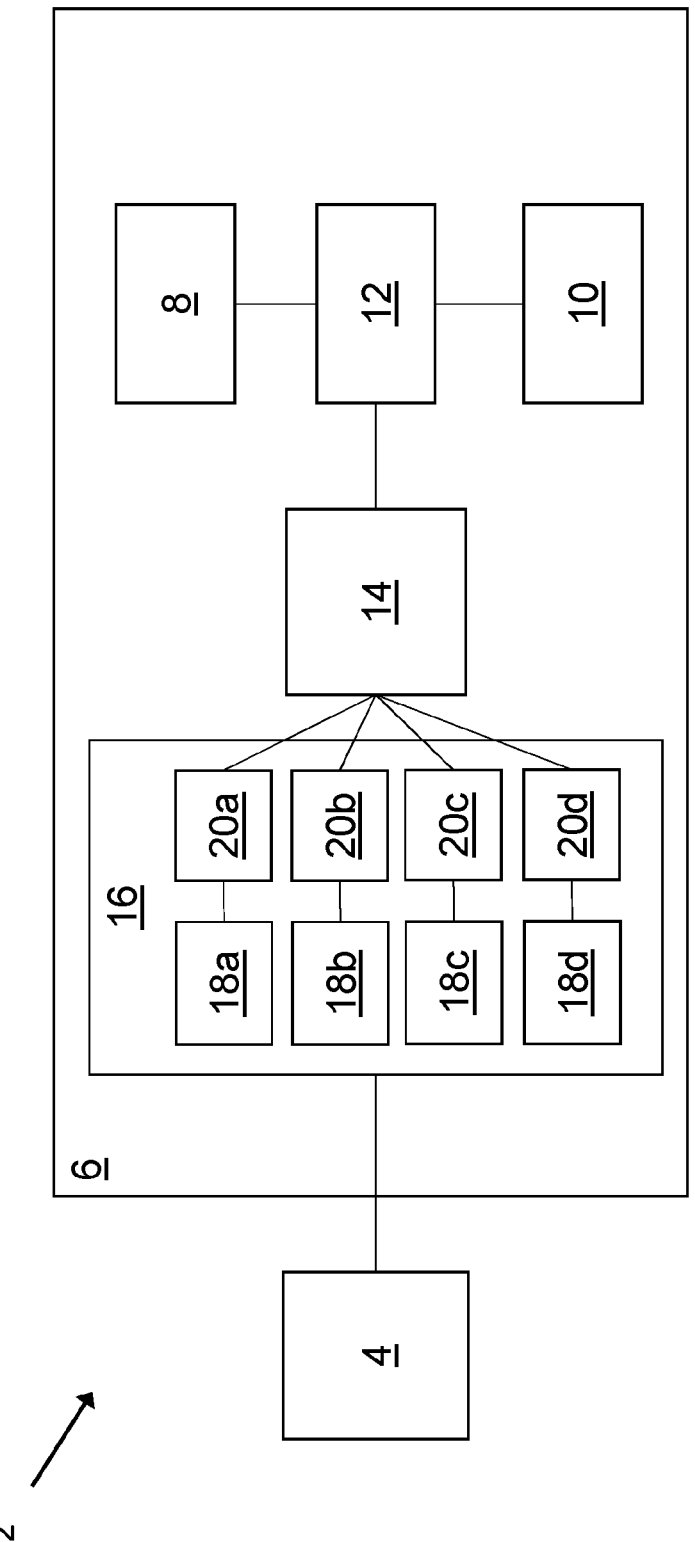
FIG. 1 is a schematic block diagram of an integrated circuit in accordance with an embodiment of the present invention.

FIG. 1 is a schematic block diagram of an secure clock domain 2 forming part of an integrated circuit in accordance with the invention. The secure clock domain comprises a critical circuit portion 4, protected by a randomly shifting clock cycle provided by a protection clock portion 6. The protection clock portion 6 comprises a static BASE register 8, a pseudorandom bit sequence (PRBS) generator 10, an OFFSET value generator 12, a selector (SEL) register 14, and a delay-line based oscillator 16. The delay-line based oscillator 16 comprises a series of delay elements (four of which 18a-d are shown), with each delay element 18a-d individually controlled by a respective multiplexer 20a-d. The SEL register 14 is connected to each of the multiplexers 20a-d and provides the selector input to each of the multiplexers 20a-d such that each delay element 18a-d can be independently included or bypassed depending on the output from the SEL register 14.

Figure 2:
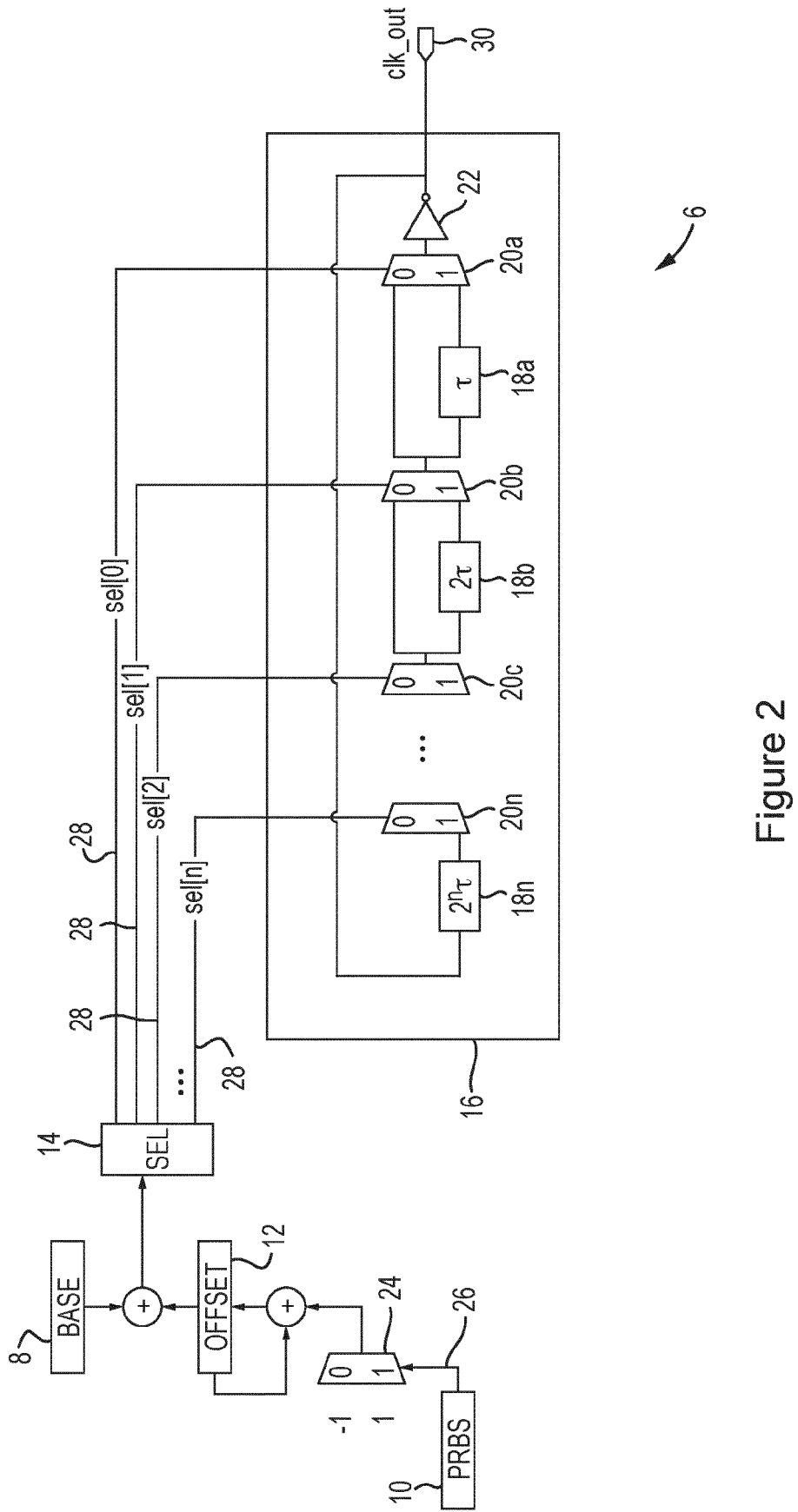
FIG. 2 is a more detailed circuit diagram of part of one of the clock domains of the integrated circuit.

FIG. 2 shows in more detail the protection clock portion 6.

The delay-line based oscillator 16 further comprises a NOT gate 22 which inverts the output of the programmable delay chain made up of the four delay elements 18. The delay-line based oscillator 16 has a feedback loop and thus its output clock signal from each clock cycle is input back to the input of the delay-line based oscillator 16.

FIG. 2 shows three of the delay elements 18a, 18b, 18n, which provide delays of $\tau$, $2\tau$ and $2^n\tau$ respectively, as each delay element 18a, 18b, 18n in the delay line based oscillator 16 is twice the length of the preceding element in the chain.

The PRBS generator 10 is connected to a multiplexer 24 which outputs a value of 1 if the PRBS output value 26 is 1 and −1 if the PRBS output value 26 is 0. The BASE register 8 also outputs a value which represents the lowest permitted value of the delay-line based oscillator 16, and therefore corresponds to the maximum frequency of the clock domain. This maximum frequency of the clock domain is predetermined taking account of the critical circuit portion 4 (see FIG. 1), which is using the clock output from the clock portion 6. It will be appreciated that the value stored in the BASE register 8 can be adjusted to fit any desired target clock frequency.

Figure 3:
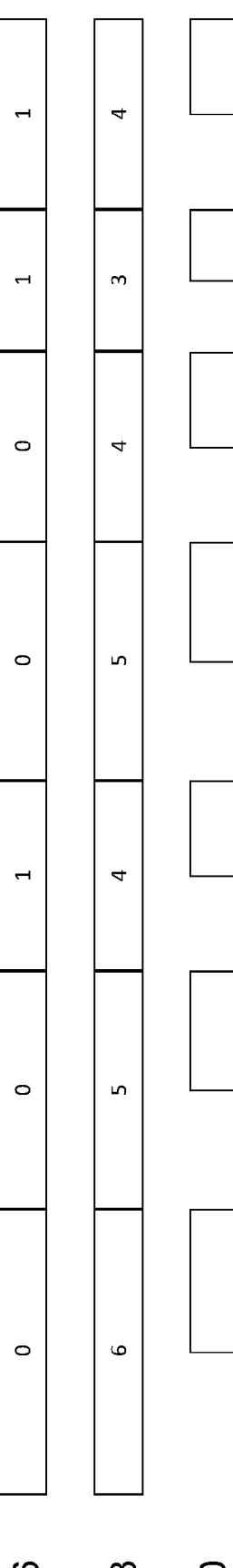
FIG. 3 is a timing diagram of the output clock signal of the clock domain of FIG. 2.

Operation of the protection clock portion 6 will now be described with reference to FIG. 2 and further reference to FIG. 3 which is a timing diagram of the output clock signal 30, showing how a pseudorandom PRBS value 26 and SEL value 28 correspond to the output clock signal 30.

An unsigned OFFSET value from the OFFSET value generator 12 is added to the BASE value from the BASE register 8 every clock cycle to produce a SEL value 28 which is output by the SEL register 14. As the unsigned OFFSET value is added to the BASE value, the SEL value is always at least slightly larger than the BASE value. Every clock cycle, the SEL register 14 is updated with a new value, which is slightly different from the previous value.

To produce the OFFSET value from the OFFSET value generator 12, every clock cycle the output from the multiplexer 24 (connected to the PRBS generator 10) is added to the OFFSET value from the previous clock cycle. As the multiplexer outputs a value of either −1 or 1, the OFFSET value is therefore incremented or decremented every clock cycle, with this increase or decrease in the OFFSET value controlled by output value 26 of the PRBS generator 10.

As explained above, the OFFSET value from each clock cycle is then added to the BASE value to produce a SEL value 28 which is output by the SEL register 14. It is clear from FIG. 3 that if the PRBS output value 26 is 0 then the SEL value 28 decreases by 1, and if the PRBS output value 26 is 1 then the SEL value 28 increases by 1.

The SEL value 28 is input to the programmable delay-line based oscillator 16. For example, for a SEL value 28 of three, the delay elements 18a and 18b will contribute to the output clock signal 30, producing a delay of $\tau$ and $2\tau$ respectively, to output an overall delay of $3\tau$. It is clear from the output clock timing signal 30 shown in FIG. 3 that the higher the SEL value 28, the longer the clock period is.

If the SEL value 28 is two, for example, then the delay element 18b would be the only delay element which is enabled to contribute to the output delay of $2\tau$ which would be added to the clock cycle.

The output from the delay-line based oscillator 16 is output by the inverting NOT gate 22 and provides the clock_out signal 30, and is also fed back on itself to the beginning of the delay-line based oscillator 16. In this way, the delay-line based oscillator 16 outputs a clock signal 30 to be used by the critical circuit portion 4 (see FIG. 1).

It will therefore be appreciated that the clock portion 6 described above provides a clock cycle 30 which jitters (deviates from true periodicity of a periodic signal) every cycle in an unpredictable manner. Since the clock cycle 30 thus has a random period due to the PRBS value 26 that controls the clock signal 30 and varies the period randomly it is not possible to reconstruct which clock edge corresponds to a given event in time since each clock cycle is random and therefore there is no correlation between the clock edge and the current operation being performed by the critical circuit portion 4 therefore making side channel attacks much more difficult.

Since every clock cycle will have a longer period than maximum frequency of the domain as predetermined by the value output from the BASE register 8, the method described above comes at a slight performance loss, since the average clock period is slightly longer. However, as the method requires no extra cycles to be executed to vary the clock period, there is no net effect on the energy consumption of the circuit. Further to this, the above-described method is simple and cheap to implement as no analogue components are required. It will also be appreciated that if there are multiple critical circuit portions 4, a clock portion 6 may be provided to protect each of these critical circuit portions 4 from side channel attacks.

It will be appreciated by those skilled in the art that the invention has been illustrated by describing one or more specific embodiments thereof, but is not limited to these embodiments; many variations and modifications are possible, within the scope of the accompanying claims. For example, a clock signal may be input to the clock portion, with the clock portion adding a random delay onto the input clock. Such an embodiment would not require a BASE register, nor would there be any requirement for feedback in the delay-line based oscillator as the clock signal itself is input to the clock portion, with the clock portion merely adding a delay, rather than itself producing the clock signal.

The invention claimed is:

1. An integrated circuit comprising:
   a non-secure clock domain comprising a first clock portion arranged to generate a first clock signal, the first clock signal being arranged to clock one or more components in the non-secure clock domain; and
   a secure clock domain comprising a protection clock portion arranged to, without receiving a clock signal from outside the secure clock domain, generate a protection clock signal having a clock period which varies randomly over at least some cycles of operation, said protection clock signal being arranged to clock one or more components in said secure clock domain, wherein the protection clock portion comprises a plurality of delay elements and a selector register, the protection clock portion being configured to incorporate one or more of the plurality of delay elements according to a selection to form a delay chain, the selection being controlled by a respective bit of a selector value in the selector register; and wherein the protection clock portion is arranged to update the selector register in successive cycles of operation with a new selector value, the new selector value being offset from a preceding selector value by an offset value, the offset value having a fixed magnitude and random polarity.

2. An integrated circuit as claimed in claim 1 arranged to vary the clock period in every cycle of operation.

3. An integrated circuit as claimed in claim 1 wherein the delay elements comprise standard cell-based unit delays.

4. An integrated circuit as claimed in claim 1 wherein each delay element adds a delay which is twice the length of the delay added by the preceding element in the chain.

5. An integrated circuit as claimed in claim 1 wherein each delay element is connected to a respective independent multiplexer and wherein each multiplexer is selectively controlled by a respective bit of a value in the selector register.

6. An integrated circuit as claimed in claim 1 wherein the protection clock portion further comprises a static register comprising a lowest permitted value of the delay chain.

7. An integrated circuit as claimed in claim 6 wherein the protection clock portion comprises an offset value generator arranged to generate a random variable which is added to said lowest permitted value to produce said selector value in said selector register.

8. An integrated circuit as claimed in claim 7 wherein the protection clock portion comprises a pseudorandom bit sequence generator arranged to provide an input to the offset value generator to randomly increase or decrease the offset value generated thereby.

9. An integrated circuit as claimed in claim 7 wherein the offset value generator comprises a feedback loop arranged to add a value to a previous offset value, such that a subsequent offset value for each clock cycle is only increased or decreased by 1.

10. A method of preventing side-channel attacks on a secure clock domain of an integrated circuit comprising a non-secure clock domain and the secure clock domain, the method comprising:

generating a first clock signal in the first clock domain;

using the first clock signal to clock one or more components in the first clock domain;

generating a protection clock signal in the secure clock domain without receiving a clock signal from outside the secure clock domain, the protection clock signal having a clock period which varies randomly over at least some cycles of operation, wherein generating the protection clock signal comprises incorporating one or more of a plurality of delay elements according to a selection to form a delay chain, the selection being controlled by a respective bit of a selector value in a selector register;

wherein the method comprises updating the selector register in successive cycles of operation with a new selector value, the new selector value being offset from a preceding selector value by an offset value, the offset value having a fixed magnitude and random polarity; and using said protection clock signal to clock one or more components in said secure clock domain.

* * * * *